United States Patent [19]

Dauer

[11] Patent Number: 4,662,928
[45] Date of Patent: May 5, 1987

[54] APPARATUS FOR FORMING A GLASS BOTTLE FINISH

[75] Inventor: William E. Dauer, Perrysburg, Ohio

[73] Assignee: Owens-Illinois, Inc., Toledo, Ohio

[21] Appl. No.: 794,919

[22] Filed: Nov. 4, 1985

[51] Int. Cl.$^4$ ............................................. C03B 9/325
[52] U.S. Cl. ........................................ 65/307; 65/236; 65/241; 65/260
[58] Field of Search ................. 65/235, 236, 241, 260, 65/307

[56] References Cited

U.S. PATENT DOCUMENTS

| | | | |
|---|---|---|---|
| 1,878,942 | 9/1932 | Lobb | 65/235 |
| 2,075,363 | 3/1937 | Smith | 65/235 X |
| 4,432,783 | 2/1985 | Dahms | 65/241 X |

Primary Examiner—Arthur Kellogg
Attorney, Agent, or Firm—John R. Nelson

[57] ABSTRACT

A neck mold for a glass champagne bottle forming system for forming bottles on the well-known I.S. forming machine is made of two matching halves that form the transfer bead and lower portion of the neck of the bottle mates with an annular, one-piece guide ring carried by the neck ring. The annular guide ring has a relatively sharp edge that matches with the plunger that forms the interior of the bottle finish and also has a flat surface, adjacent the sharp edge, that extends at a 25° angle with the horizontal and forms a planar sloping surface on the inner, upper surface of the bottle with the planar surface being joined to a flat, generally horizontal surface that extends to a curved surface that in turn extends over the top of the bottle finish to an outer annular line where the guide and neck ring mold meet. The resulting bottle produced is one which does not require fire polishing to remove any mold match lines or beads that might interfere with proper sealing of the corks.

1 Claim, 8 Drawing Figures

4,662,928

APPARATUS FOR FORMING A GLASS BOTTLE FINISH

BACKGROUND OF THE INVENTION

It has been the practice to use as standard neck ring equipment for champagne finishes a two-piece construction consisting of a vertically split neck ring and plunger. This construction is illustrated in FIGS. 1 and 2 of the accompanying drawings. With such a construction, a finish such as is shown in FIG. 3(a) is produced where a vertical split line or seam is formed that extends up the outside of the container finish and extends over the top sealing surface terminating where the neck ring meets the plunger.

In order to eliminate this split line or seam in the top of the finish, it has been necessary to subject the finish to a gas flame or to what is termed "fire polishing" to, in effect, smooth the top of the finish by melting the seam line and having it blend into the surrounding glass.

This involves an after-forming process that is costly to perform from the standpoint of time and fuel costs in assuring effective treatment.

Furthermore, the rounded configuration of the prior art champagne finish also produced an annular ring of glass where the plunger and neck ring met. This would contribute to a situation where, if natural cork were being used to seal the bottle after filling, frequently the annular ring would tend to have an outer portion "stripped" by engaging this annular protruding ring that can often be fairly sharp. It should be kept in mind that the natural corks that are used are intended to be significantly compressed as they are forced into the container neck to effect a good, gas tight seal. Champagne, of course, is bottled with fairly high carbonation and the included gases exert a significant internal pressure on the cork.

SUMMARY OF THE INVENTION

Apparatus for forming the finish of a glass champagne bottle wherein an annular two-piece neck ring or mold seats against the bottom of a parison mold, an annular guide ring seats against the neck ring and has an inwardly sloping annular surface that is adapted to "match" the outside of the plunger and guide the plunger in its vertical reciprocation, the annular edge of the guide ring that guides the plunger is in the form of a "knife edge" with a gap therebetween of no more than 0.004 of an inch. The apparatus forms the neck of a champagne bottle that does not require fire polishing before acceptance of a cork.

With the foreing in view, it is an object of this invention to provide a neck-mold guide ring and plunger combination that will make a champagne bottle neck that does not require fire polishing and which bottle finish is formed without any seams or parting lines formed over the sealing surface of the finish.

Other and further objects will be apparent from the following description taken in conjunction with the annexed sheets of drawings wherein.

DETAILED DESCRIPTION OF THE DRAWINGS

Figure 1:
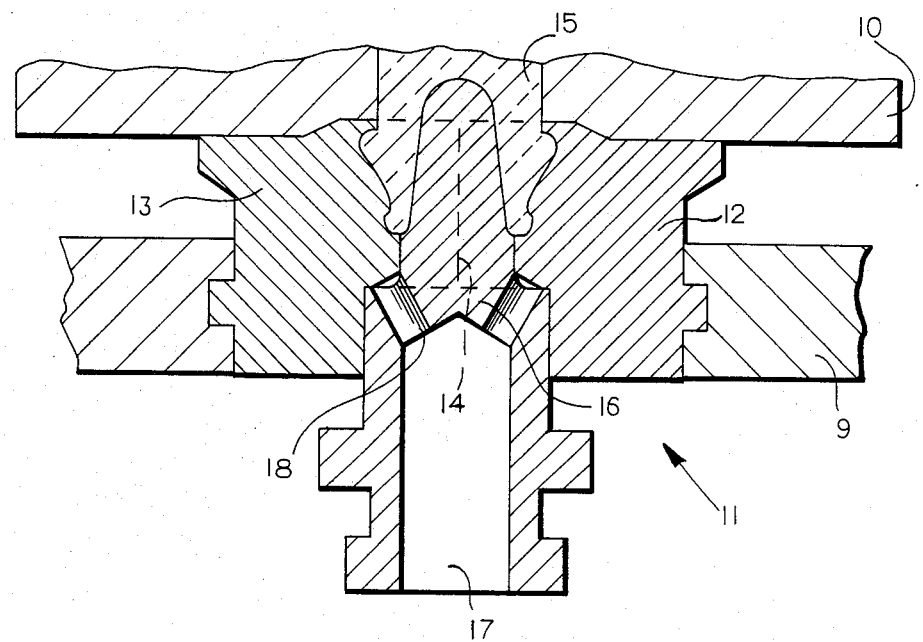
FIG. 1 is a vertical sectional view through the prior art parison mold neck ring and plunger in glass molding position.
Figure 2:
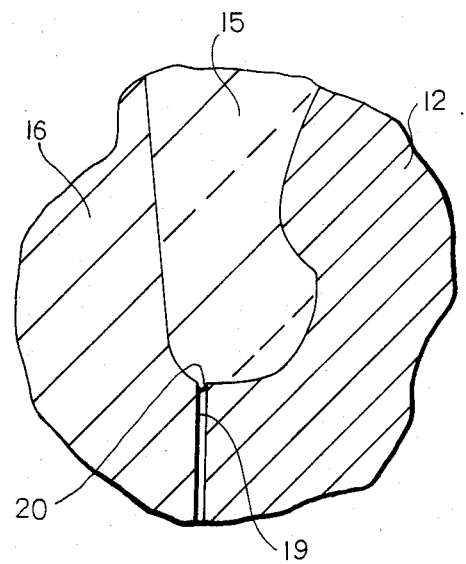
FIG. 2 is an enlarged sectional view of the plunger, glass finish and neck mold of FIG. 1.
Figure 3A:
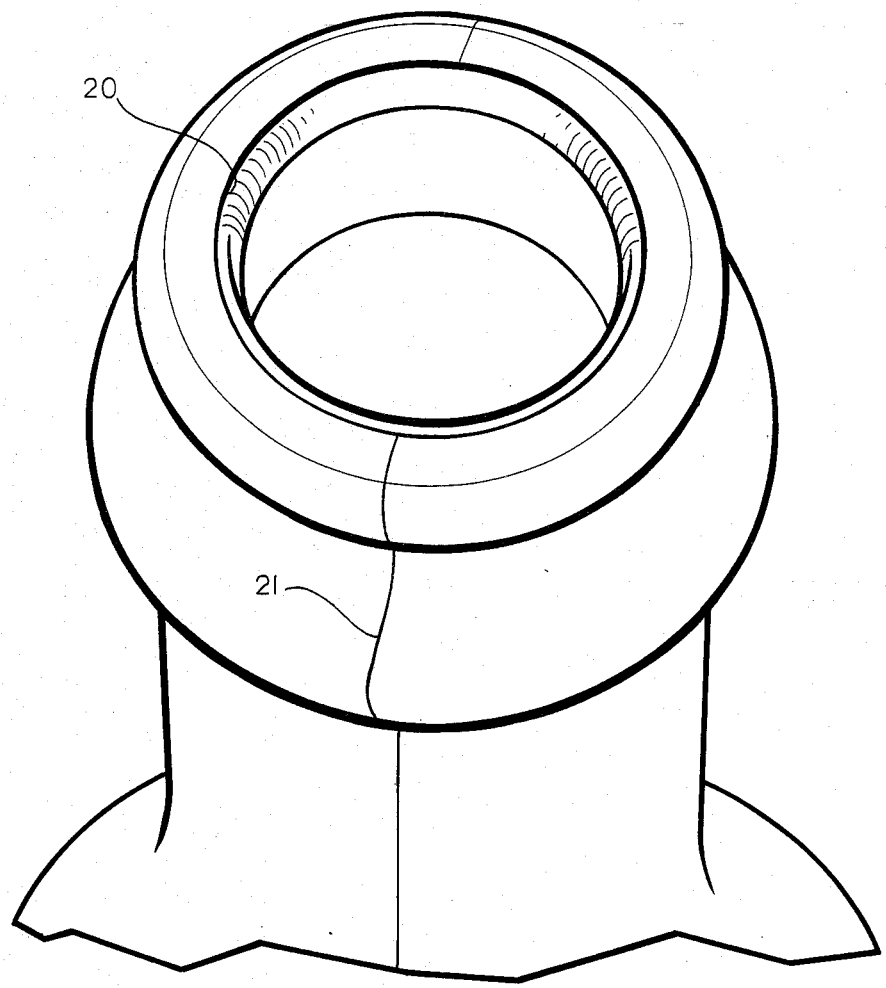
FIG. 3(a) is a perspective view of the neck or finish of a prior art champagne bottle in its as-molded configuration.

As explained hereinbefore, FIGS. 1 and 2 illustrate the known prior art apparatus for forming the currently produced champagne finish as shown in FIG. 3(a). The finish of FIG. 3(a), after fire polishing, is shown in FIG. 3(b).

A split parison mold 10 is shown overlying a vertically split neck mold 11 formed of halves 12 and 13 that meet along the vertical parting line 14. The neck mold 11 forms an annular interior configuration that is the outside of the finish of a glass bottle. The neck molds are carried in the conventional invert arm 9 of the glass forming machine. The molds 10 and 11 are shown in FIG. 1 as holding a body of molten glass 15. The molten glass 15 during the forming of the bottle finish in the well known blow and blow process performed on the I.S. (Individual Section) forming machine is forced down into the neck mold in surrounding relationship to a plunger 16 by the application of air under pressure to the top of the glass confined in the parison mold 10. This is termed "settle blow" in the art. The plunger is provided with a hollow stem portion 17 and a plurality of upwardly open passages 18 through which "counterblow air" is introduced after the plunger is "pulled" or moved downward to expose the interior of the neck of the container being formed. The "Counterblow air" is applied and the air under pressure forces the hot interior glass of the parison upward and outward into contact with the interior of the split parison mold 10 and with a baffle (not shown) that closes the open top of the mold. This imparts the parison or preform shape to the glass before it is transferred by its neck to a blow mold that has the final bottle shape and the parison is expanded into this shape by the application of blow air to the interior thereof.

The neck of the bottle does not change in external shape once it is formed in the neck mold. Thus it can be seen when viewing FIGS. 1 and 2, where the neck mold halves 12 and 13 are shown closed and with the plunger 16 in its up position, that the neck or "finish" of the bottle, when formed, will have an essentially annular shape best shown in cross-section in FIG. 2. Since there is a "match" line 19 formed where the plunger and the neck mold mate, this match line 19 results in forming an annular bead 20 which extends about the annulus of the top of the neck of the bottle. Additionally, there will be a vertical seam 21 at each side of the neck which corresponds to the parting line 14 for the neck molds 12 and 13. Since the annular bead 20 is in the surface portion of the container or bottle finish which is critical in the sealing of the neck with a cork, either natural or plastic, it has been the practice to "fire polish" the finish of most of the ware produced to eliminate this bead and parting line at the finish. "Fire polishing" is the application of an open gas flame to the finish for a time sufficient to cause the bead to become remelted and to flow into and become a part of the rounded end or top of the finish.

Figure 3B:
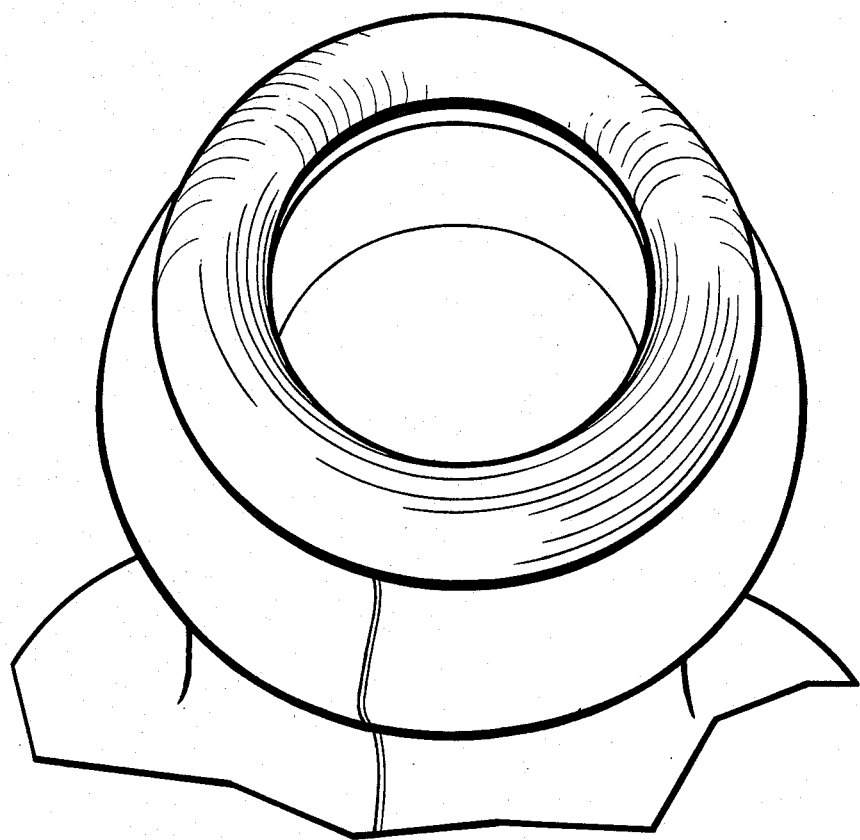
FIG. 3(b) is the bottle finish of FIG. 3(a) after fire polishing.

With reference to FIGS. 3(a) and 3(b), it can be seen what "fire polishing" accomplishes. In FIG. 3(a) the annular bead 20 is illustrated and the vertical seam 21 can be seen also. The seam 21 will extend up the outside of the finish and join at its upper end with the bead 20. This is because the seam is produced at the parting line 14 between the mold halves 12 and 13. The annular bead 20 is formed at the juncture or match line 19 of the neck ring and plunger 16.

Figure 4:
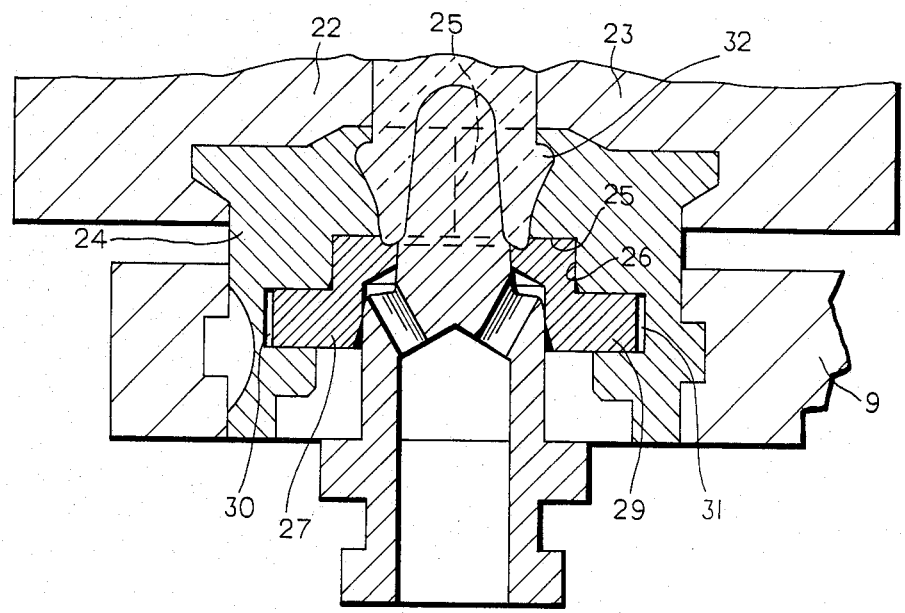
FIG. 4 is a vertical sectional view through the parison mold, neck mold, guide ring and plunger combination of the invention.
Figure 5A:
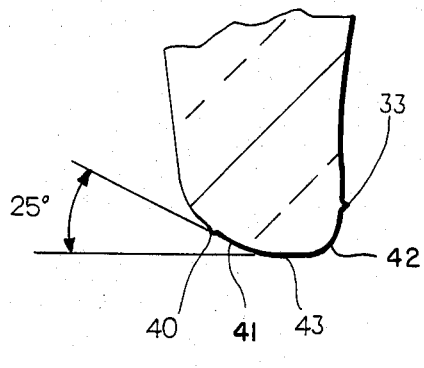
FIG. 5a is an enlarged sectional view of the glass finish illustrated in FIG. 4.
Figure 5B:
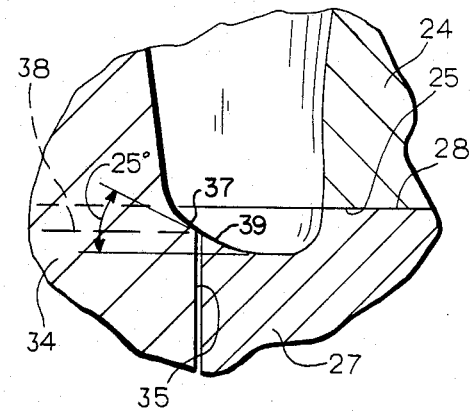
FIG. 5b is an enlarged sectional view of illustrating the relationship of the plunger, guide ring and neck mold of FIG. 4.
Figure 6:
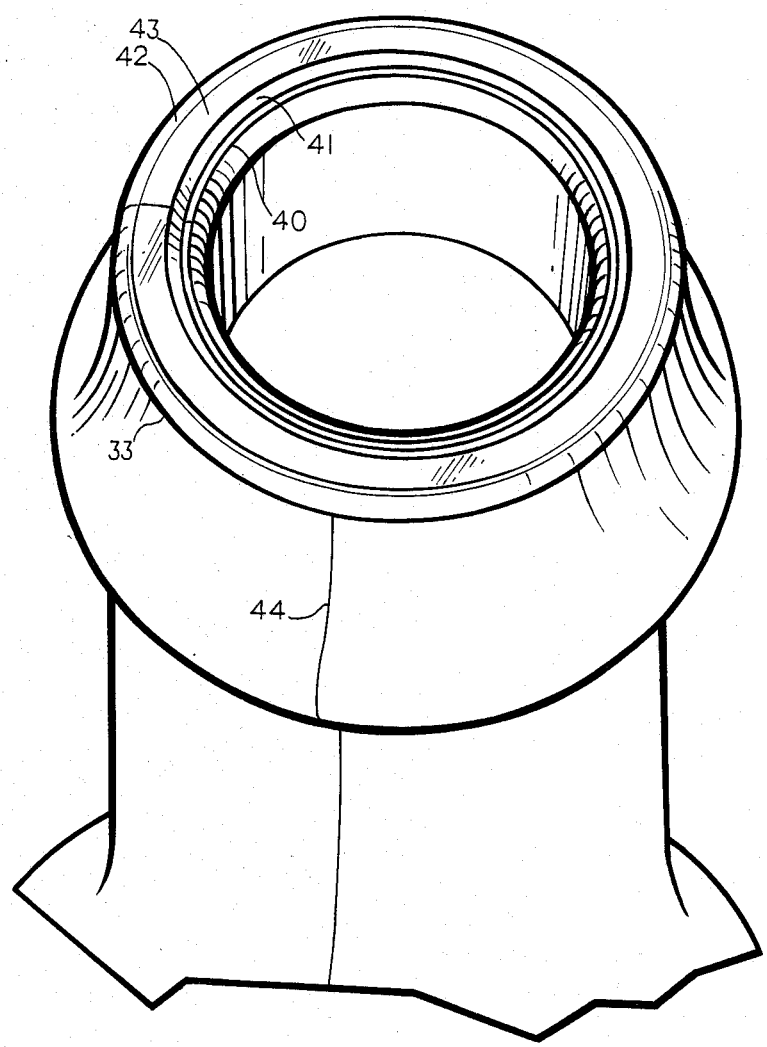
FIG. 6 is a perspective view on an enlarged scale of a bottle finish resulting from using the apparatus of FIGS. 4 and 5.

With particular reference to FIGS. 5a and 6, the configuration of the neck o finish of the container of the invention can be seen and with reference to FIGS. 4 and 5b, the construction of the neck molding apparatus will be described.

A pair of parison mold halves 22 and 23, as in the case of the prior art, define a hollow cavity in which the parison is formed. The lower end of the parison mold is closed by a two-piece or vertically split neck mold 24. The split line or neck mold match line is shown in dotted line at 25. The neck mold 24 is formed with an outwardly extending horizontal ledge 25 which extends to a vertically oriented cylindrical surface 26. The surfaces 25 and 26 are locating surfaces for a one-piece, annular guide ring 27. The guide ring 27 has a top surface 28 which is adapted to mate with and engage the surface 25 of the neck mold when in molding position as shown in FIGS. 4 and 5b. The guide 27 is formed with a radially extending flange 29 which fits within a pair of opposed inwardly opening, horizontal slots 30 and 31 formed in the halves of neck mold 24. The flange 29 remains in the slots of the neck mold even when the neck molds are opened, since the neck molds only open a fairly small amount, sufficient to permit the transfer bead 32 of the finish to clear the open neck mold halves.

As best shown in FIGS. 5a and 6, the juncture of the guide ring surface 28 and the neck mold surface 25 will form a horizontal, annular line 33 extending about the outer circumference of the neck of the glass container being formed between the mold 24, the guide ring 27 and a plunger 34 that is centered in the cavity of the neck mold. The plunger has an outer surface 36 of the guide ring 27. The plunger and guide ring both form a portion of the inner neck of the finish being formed in the neck mold.

It should be understood that the steps that are performed on the charge of glass that is introduced into the parison and neck mold of the FIG. 4 and 5b embodiments is the same as that performed with the prior art mold mechanism of FIGS. 1 and 2. This means that the plunger 34 is positioned, as shown in FIGS. 4 and 5b, with the lower, outwardly rounded surface 37 matching up at 38 with a "knife edge" surface 39 of the guide ring 27. An annular bead 40 (FIGS. 5a and 6) will be formed inside the inwardly sloping surface 41 that is formed by the flat surface portion 39 of the guide ring 27. This flat surface 39 of the ring extends down at approximately a 25° angle with respect to the horizontal as shown in FIG. 5b. The surface 41 blends into a generally horizontal, flat surface 43 which blends into a curved surface 42 that extends to the match line 33 formed at the juncture of surfaces 25 and 28.

It can be seen when viewing FIG. 6 that a vertical seam 44, formed at the parting line 25 of the neck mold halves of FIG. 4, does not extend above annular match line 33 since that portion of the finish is formed in the one-piece annular guide 27. Only the match line 40 will appear on the sloping inner surface of the annulus forming the upper neck portion of the champagne bottle of the invention. The surfaces 41, 42 and 43 that are formed in the ring 27 will be totally free of any seams or beads of glass which, in the prior art, have caused "leakers" or interfered with a proper seal of the cork or stopper in the bottle neck.

Furthermore, the annular bead 20 in the prior art bottle finish, if not fire polished to remove the bead, would frequently tear or slice the cork as it was applied to the interior of the finish in the corking operation where natural corks are pushed into the neck of the filled champagne bottle. With the present invention, the slight line 40 at the plungerguide ring match is actually formed at the end of the sharp "knife edge" surface 39 and will be only a very slight mark or bead formed on the bottle which will not be sharp enough to slice the cork as it is applied. The flat surface 41, at the 25° angle, will help to center and guide the cork during application of the cork to the filled bottle.

Thus it can be seen that the neck molding system of the invention will produce the new bottle finish that is free of potential leak producing defects and cork slicing tendencies without the expense and time required to "fire polish" the bottle neck or finish of glass champagne bottles after molding.

What is claimed:

1. Apparatus for forming the finish or neck of a glass champagne bottle to receive a cork therein; comprising an annular two-piece neck ring; said neck ring or mold adapted to seat against the bottom of a parison mold, a one-piece ring, said guide ring being formed with a cylindrical, annular plunger guiding surface terminating at its upper end in a "knife edge" surface, a neck plunger having a rounded tip connected by an outwardly tapering, frusto-conical wall section to a lower, outwardly rounded surface at the base thereof, said "knife edge" surface forming the inner edge of a semi-toroidal surface which mates with the outwardly rounded surface at the base of the plunger, said guide ring being supported by said neck mold which in turn is carried by an invert arm.

* * * * *